United States Patent
Ueno

(10) Patent No.: US 6,820,003 B2
(45) Date of Patent: Nov. 16, 2004

(54) NAVIGATION APPARATUS

(75) Inventor: Kiyoko Ueno, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,413

(22) Filed: Nov. 2, 2001

(65) Prior Publication Data

US 2002/0177946 A1 Nov. 28, 2002

(30) Foreign Application Priority Data

May 28, 2001 (JP) ........................................ 2001-159236

(51) Int. Cl.$^7$ .............................................. G01C 21/34
(52) U.S. Cl. ................... 701/209; 701/211; 340/995.19; 340/995.2
(58) Field of Search ................................ 701/207, 208, 701/209, 210, 211, 212; 340/988, 990, 995, 995.1, 995.19, 995.2; 345/649, 672

(56) References Cited

U.S. PATENT DOCUMENTS

| | | | | | |
|---|---|---|---|---|---|
| 4,737,916 | A | * | 4/1988 | Ogawa et al. ............... | 701/200 |
| 5,313,200 | A | * | 5/1994 | Sone .......................... | 340/905 |
| 5,428,545 | A | * | 6/1995 | Maegawa et al. ........... | 701/210 |
| 5,452,212 | A | * | 9/1995 | Yokoyama et al. ......... | 701/211 |
| 5,787,382 | A | * | 7/1998 | Kurabayashi ............... | 701/214 |
| 5,862,509 | A | * | 1/1999 | Desai et al. ................. | 701/209 |
| 5,862,510 | A | * | 1/1999 | Saga et al. .................. | 701/211 |
| 5,884,217 | A | * | 3/1999 | Koyanagi .................... | 701/208 |
| 5,908,464 | A | * | 6/1999 | Kishigami et al. .......... | 701/208 |
| 5,925,091 | A | * | 7/1999 | Ando .......................... | 701/212 |
| 5,991,689 | A | * | 11/1999 | Aito et al. ................... | 701/209 |
| 6,034,626 | A | * | 3/2000 | Maekawa et al. ....... | 340/995.21 |
| 6,052,645 | A | * | 4/2000 | Harada ........................ | 701/212 |
| 6,061,629 | A | * | 5/2000 | Yano et al. .................. | 701/209 |
| 6,144,318 | A | * | 11/2000 | Hayashi et al. ............. | 340/995 |
| 6,144,920 | A | * | 11/2000 | Mikame ...................... | 701/212 |
| 6,175,803 | B1 | * | 1/2001 | Chowanic et al. .......... | 701/209 |
| 6,202,026 | B1 | * | 3/2001 | Nimura et al. .............. | 701/211 |
| 6,278,935 | B1 | * | 8/2001 | Kaplan et al. .............. | 701/200 |
| 6,421,604 | B1 | * | 7/2002 | Koyanagi et al. ........... | 701/208 |

FOREIGN PATENT DOCUMENTS

JP     A11-72341     3/1999

* cited by examiner

*Primary Examiner*—Gary Chin
(74) *Attorney, Agent, or Firm*—Birch, Stewart, Kolasch & Birch, LLP

(57) ABSTRACT

A navigation apparatus is configured to generate display data of a rough route map extracting only information, which satisfies a display condition, when the display condition is set for the rough route map. For example, when a display condition for displaying a rough route map regarding only a main road is set, display data is generated for the rough route map regarding only the main road.

14 Claims, 6 Drawing Sheets

NAVIGATION APPARATUS

BACKGROUND OF THE INVENTION

1. Field of the Invention

This invention relates to a navigation apparatus for displaying a rough route map.

2. Description of the Prior Art

When a route from a present position to a destination is searched, a conventional navigation apparatus generates display data of a rough route map based on the searched route, and displays the rough route map in accordance with the display data.

FIG. 8 shows the display example of a rough route map. FIG. 9 shows original data regarding the rough route map. In the drawings, reference numerals S1 to S5 each denote a street names, S1 especially representing a street name, on which a vehicle is currently running; SD denotes a street name, on which a destination is located; LD denotes a route distance from a present position to the destination; and PT1 to PT5 each denote a guiding point which contains information regarding characteristics of the guiding points (e.g., left or right turn, roundabout, and so on). Reference numerals L1 to L5 each denote a distance from a given guiding point to a next guiding point; and AT1 to AT5 each attribute information, which may be used to identify a road width, a road number, a toll or toll-free road, and so on.

As shown in FIG. 8, the conventional navigation apparatus displays a turning direction at a guiding point, a distance between the guiding points, and so on, in addition to all the street names in the route. Consequently, if a route is long-distance, the list of the rough route map reaches several tens of lines, making it impossible to display all the listed points on one screen. Thus, in order to view desired information, it is necessary for a user to repeat a screen scrolling operation.

The conventional navigation apparatus constructed in the foregoing manner displays all the street names, and other bits of information in the route. Therefore, bits of information unneeded by the user may be mixed in the rough route map. Such mixing of unnecessary information has, in the convention art, required the user to extract necessary information by executing a screen scrolling operation.

SUMMARY OF THE INVENTION

The present invention was made to solve the foregoing problem, and it is an object of the invention to provide a navigation apparatus, which enables a user to view desired information without performing any burdensome operations.

In accordance with an aspect of the invention, there is provided a navigation apparatus designed to generate display data of a rough route map extracting only information satisfying a display condition, when the display condition is set for the rough route map.

According to the navigation apparatus of the invention, when a display condition is set for displaying a rough route map regarding only a main road, display data of the rough route map regarding only the main road is generated.

According to the navigation apparatus of the invention, when a display condition is set for displaying a rough route map regarding only a road having a road number added thereto, display data of the rough route map regarding only the road having the road number added thereto is generated.

According to the navigation apparatus of the invention, when a display condition is set for displaying a rough route map regarding only a toll road, display data of the rough route map regarding only the toll road is generated.

According to the navigation apparatus of the invention, when a vehicle starts running on a toll road, display data for displaying only information regarding the toll road is generated.

According to the navigation apparatus of the invention, when a display condition is set for displaying a rough route map regarding only a left-turn road, display data of the rough route map regarding only the left-turn road is generated.

According to the navigation apparatus of the invention, when a display condition is set for displaying a rough route map regarding only a right-turn road, display data of the rough route map regarding only the right-turn road is generated.

According to the navigation apparatus of the invention, when a display condition is set for displaying a rough route map regarding only a road adjacent to a specified facility, display data of the rough route map regarding only the road adjacent to the specified facility is generated.

According to the navigation apparatus of the invention, when a display condition is set for displaying a rough route map regarding only a traffic jam, display data of the rough route map regarding only the traffic jam is generated.

According to the navigation apparatus of the invention, when the rough route map regarding the traffic jam is displayed in accordance with the display data generated by data generating means, a degree of congestion is displayed.

According to the navigation apparatus of the invention, when the rough route map is displayed in accordance with the display data generated by the data generating means, displaying is executed, indicating that only a rough route map satisfying the display condition is being displayed at present.

According to the navigation apparatus of the invention, when display data is generated for the rough route map satisfying the display condition, a distance between roads satisfying the display condition is calculated by considering presence of a road having been omitted because of dissatisfaction of the display condition, and data of the distance is included in the display data.

According to the navigation apparatus of the invention, when setting of the display data for the rough route map is accepted, setting of a logical product/logical sum of one or more display conditions is accepted.

In accordance with another aspect of the invention, there is provided a navigation apparatus designed to generate display data of a rough route map for displaying names of respective roads in a route searched by route searching means in a list form, and extract, when a display condition is set, roads from the respective roads in the searched route in accordance with the display condition, and then generate display data of the rough route map for displaying names of the extracted roads in a list form.

DETAILED DESCRIPTION OF THE PREFERRED EMBODIMENTS

Next, the preferred embodiments of the present invention will be described.

First Embodiment

Figure 1:
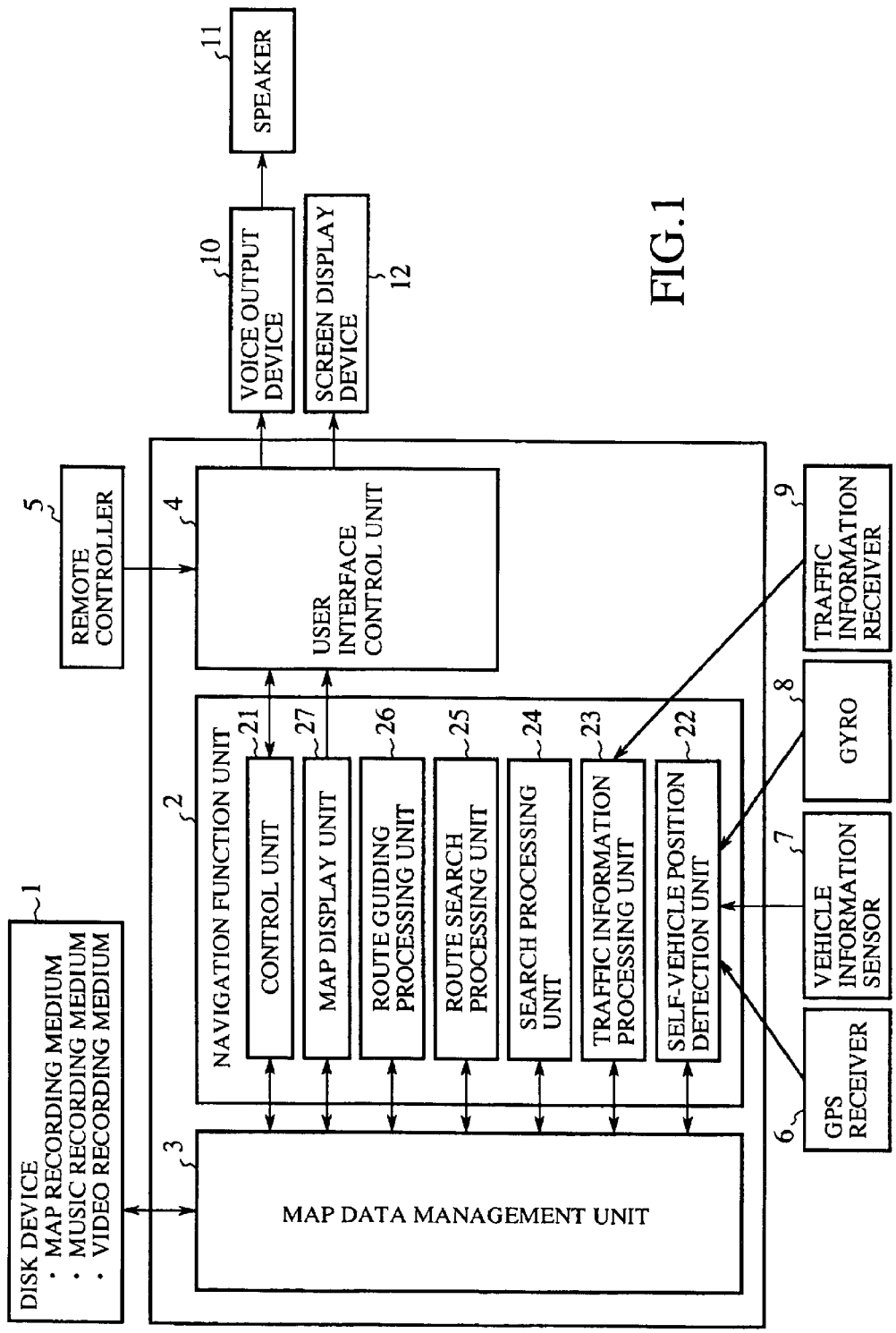
FIG. 1 is a configuration view showing a navigation apparatus of a first embodiment of the present invention.

FIG. 1 is a configuration view showing the navigation apparatus of the first embodiment of the invention. In the drawing, a reference numeral 1 denotes a disk device for storing map data, music data, and so on; 2 denotes a navigation function unit; 3 denotes a map data management unit for reading the map data from the disk device 1 according to a request from the navigation function unit 2, and transferring the map data to the navigation function unit 2; and 4 denotes a user interface control unit.

A reference numeral 5 denotes a remote controller for setting a display condition or the like for a destination, and a rough route map; 6 denotes a GPS receiver for receiving a signal from a GPS satellite, and calculating information regarding the present position of a vehicle; 7 denotes a vehicle information sensor; 8 denotes a gyro; 9 denotes a traffic information receiver for receiving traffic information such as congestion information; 10 denotes a voice output device; 11 denotes a speaker; and 12 denotes a screen display device.

A reference numeral 21 denotes a control unit for controlling the user interface control unit 4 or the like; 22 denotes a self-vehicle position detection unit for detecting the present position of a vehicle based on the present position information or the like of the vehicle, received from the GPS receiver 6; 23 denotes a traffic information processing unit for processing traffic information received by the traffic information receiver 9; 24 denotes a search processing unit for searching a facility or the like adjacent to a road; 25 denotes a route search processing unit (route searching means) for searching a route from a present position to a destination; 26 denotes a route guiding processing unit (data generating means) for generating display data of a rough route map, for displaying names of roads in a list form, based on the route searched by the route search processing unit 25; and 27 denotes a map display unit for supplying the display data generated by the route guiding processing unit 26 to the user interface control unit 4.

Figure 2:
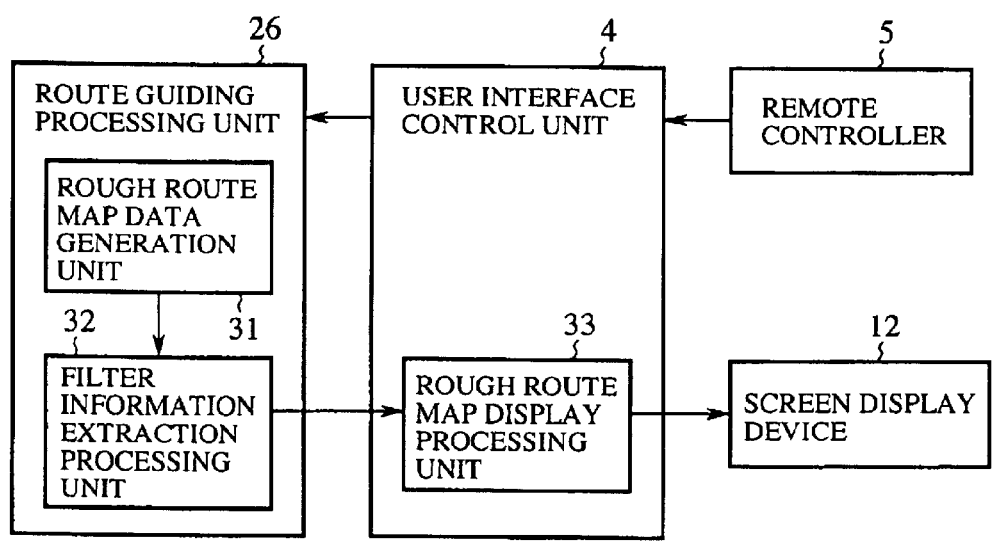
FIG. 2 is a configuration view showing insides of a route guiding processing unit and a user interface control unit.

FIG. 2 is a configuration view showing the insides of the route guiding processing unit 26 and the user interface control unit 4. In the drawings, a reference numeral 31 denotes a rough route map data generation unit for generating display data of a rough route map based on the route searched by the route search processing unit 25; 32 denotes a filter information extraction processing unit for generating, when a user operates the remote controller 5 to set a display condition of a rough route map, display data of the rough route map extracting only information satisfying the display condition; and 33 denotes a rough route map display processing unit (displaying means) for displaying the rough route map according to the display data generated by the filter information extraction processing unit 32.

Figure 3:
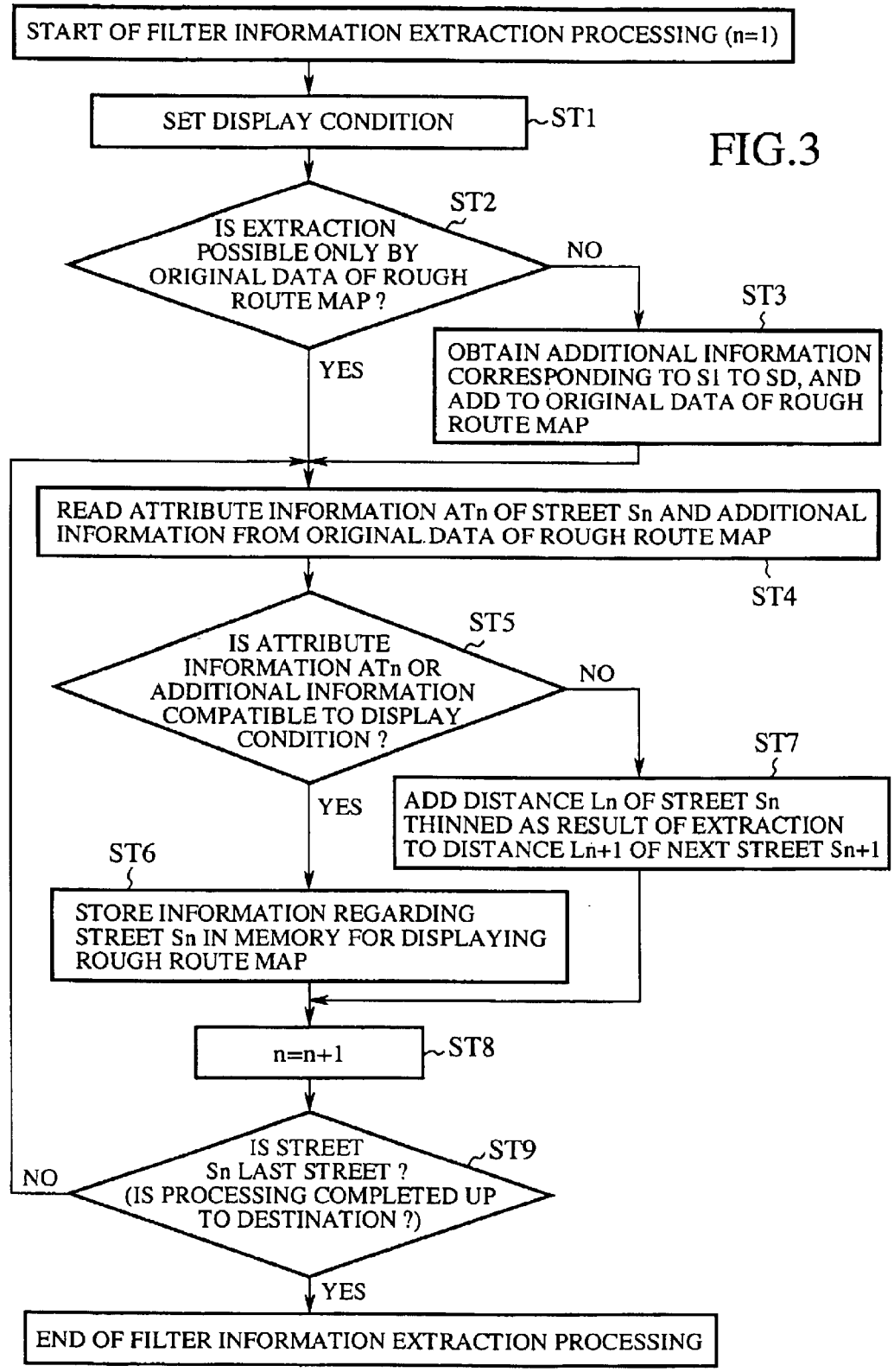
FIG. 3 is a flowchart showing a processing content of a filter information extracting processing unit.
Figure 4:
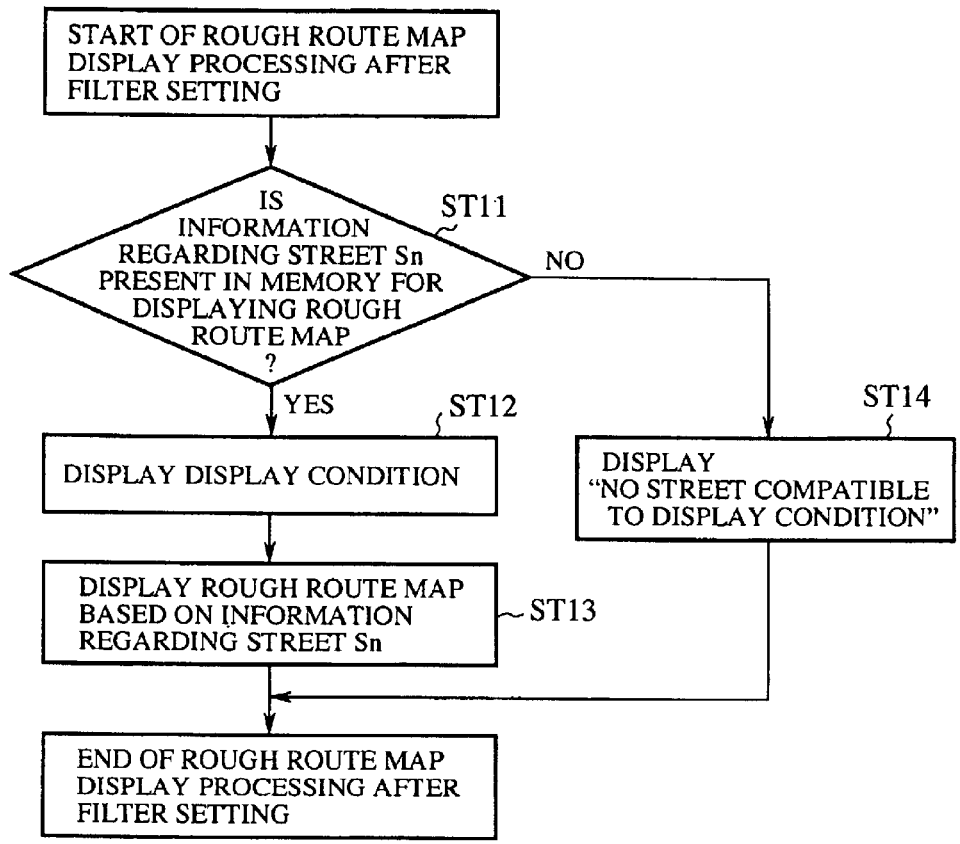
FIG. 4 is a flowchart showing a processing content of a rough route map display processing unit.

FIG. 3 is a flowchart showing the processing content of the filter information extraction processing unit 32; and FIG. 4 is a flowchart showing the processing content of the rough route map display processing unit 33.

Next, the operation of the navigation apparatus will be described.

First, when the user operates the remote controller 5 to set a destination, the route search processing unit 25 searches a route from a present position detected by the self-vehicle position detection unit 22 to a destination.

After the searching of the route from the present position to the destination by the route search processing unit 25, the route guiding processing unit 26 generates display data of a rough route map based on the searched route.

If no display conditions have been set for a rough route map, as in the conventional case, display data is generated for a rough route map having listed up all the street names, and so on, in the route. However, when the user operates the remote controller 5 to set a display condition for a rough route map, display data is generated for a rough route map extracting only information satisfying the display condition.

Figure 5:
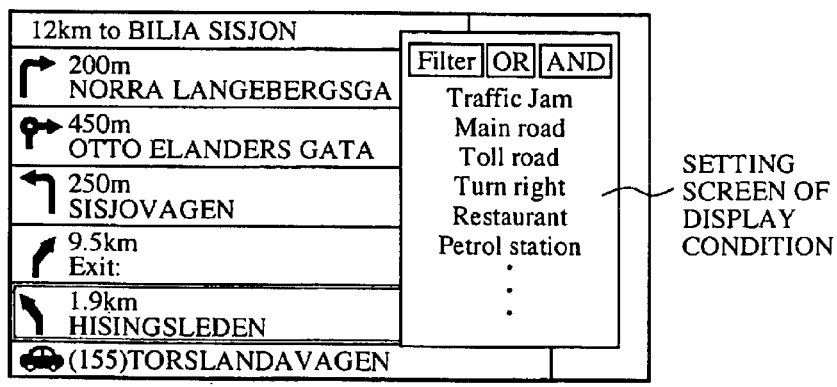
FIG. 5 is a view illustrating a display condition setting screen for setting a display condition of a rough route map.

FIG. 5 shows a display condition setting screen for setting a display condition for a rough route map. The example of FIG. 5 shows items to be included in the rough route map, i.e., a traffic jam, a main road, a toll road, a right-turn road, a road adjacent to a restaurant, a road adjacent to a petrol station, and so on, which can be selected and accepted. The user can select one or a plurality of desired items from the display condition setting screen, and set a display condition.

Now, specific description will be made of the processing content of the filter information extraction processing unit 32 in the route guiding processing unit 26.

When a display condition is set (step ST1), the filter information extraction processing unit 32 determines whether all bits of information satisfying the display condition can be obtained or not from the original data of a rough route map (step ST2).

For example, if a display condition is a main road, a toll road, a right-turn road or the like, the original data of the rough route map is enough. However, if a display condition is the presence of a traffic jam, a nearby facility or the like, then additional information other than the original data of the rough route map is necessary. Information regarding a traffic jam is obtained by the traffic information processing unit 23, and information regarding the presence of a nearby facility is obtained by the search processing unit 24.

Figure 7:
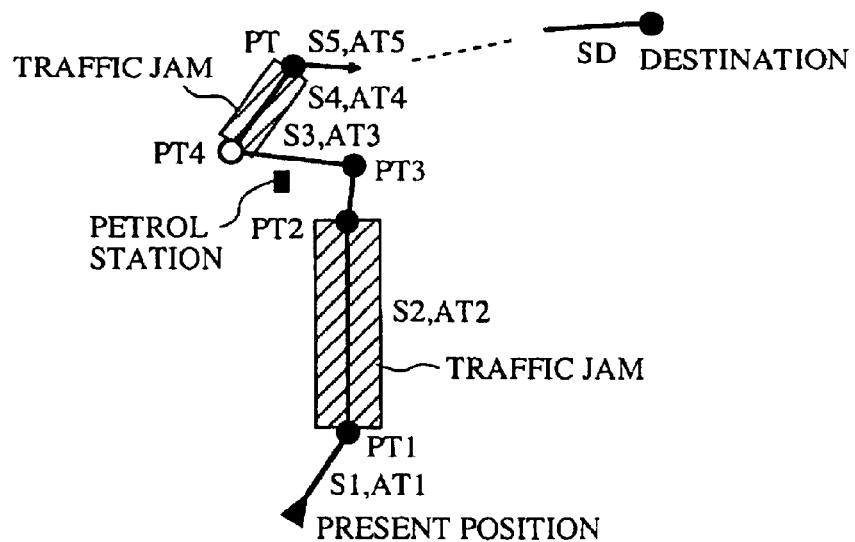
FIG. 7 is a view illustrating original data of the rough route map after additional information addition.
Figure 8:
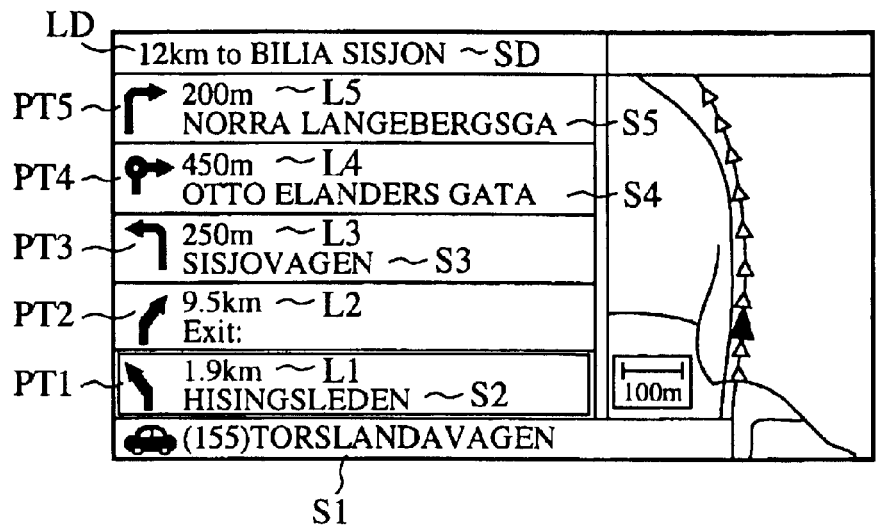
FIG. 8 is a view showing a display example of a rough route map in the prior art.
Figure 9:
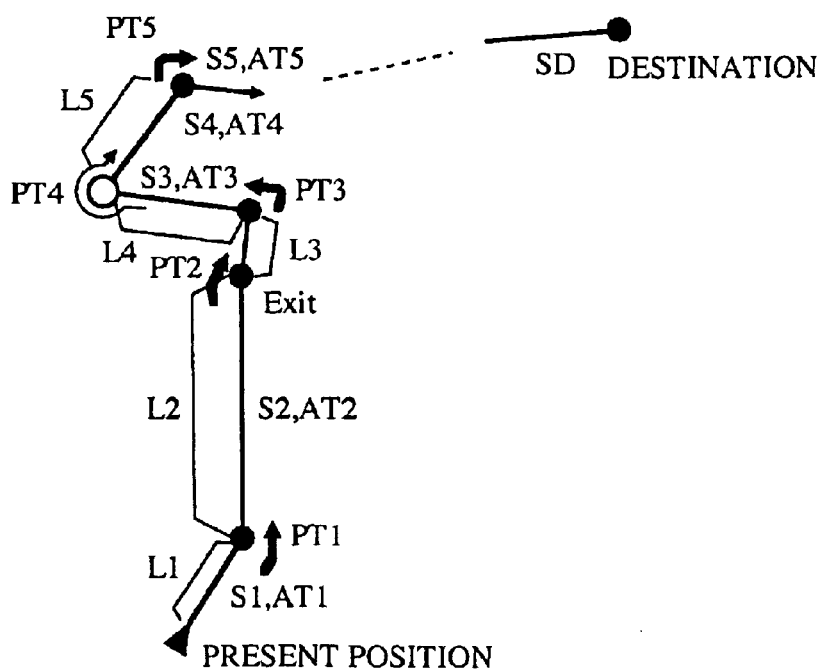
FIG. 9 is a view illustrating original data of the rough route map in the prior art.

When such additional information is obtained, the additional information is added to the original data of the rough route map (step ST3). For example, if "TRAFFIC JAM" and "ROAD ADJACENT TO PETROL STATION" are set as display conditions for the rough route map, additional information is added to the original data of the rough route map like that shown in FIG. 7.

Then, the filter information extraction processing unit 32 reads the attribute information ATn of a target street Sn and the additional information from the original data of the rough route map, to which the additional information has been added (step ST4), and determines whether the attribute information ATn or the additional information is compatible to the display condition or not (step ST5).

If compatibility to the display condition is determined, information regarding the target street Sn is stored in a memory for displaying the rough route map (step ST6). If incompatibility to the display condition is determined, then the street Sn is omitted from a display target, and thus a distance Ln of the street Sn is added to a distance Ln+1 of a next street Sn+1 (step ST7).

The filter information extraction processing unit 32 increments n only by 1 (step ST8), and determines whether the street Sn is a last street or not (step ST9). If the street Sn is not a last street, then the process returns to step ST4. If a last street, the process is completed.

Figure 6:
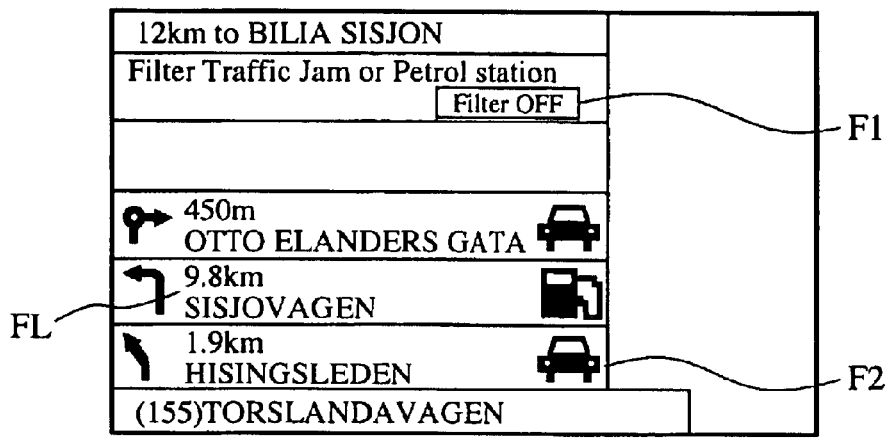
FIG. 6 is a view showing a display example of the rough route map after filter setting execution.

After the completion of the foregoing processing by the filter information extraction processing unit 32, the rough route map display processing unit 33 determines whether the information regarding the street Sn has been stored or not in the memory for displaying the rough route map (step ST11). If the information regarding the street Sn has been stored, the display condition for the rough route map is displayed as shown in FIG. 6 (step ST12). In the example of FIG. 6, "TRAFFIC JAM" and "ROAD ADJACENT TO PETROL STATION" are displayed as display conditions of the rough route map in F1. By selecting "FILTER OFF", all the display conditions can be cleared.

In addition, the rough route map display processing unit 33 displays the rough route map based on the information regarding the street Sn stored in the memory for displaying the rough route map (step ST13). In the example of FIG. 6, information regarding "TRAFFIC JAM" and "ROAD ADJACENT TO PETROL STATION" is displayed (e.g., street name, street distance, running direction or the like). F2 is a symbol indicating the kind of information: a car mark indicating a traffic jam, and a degree of congestion being indicated by color. A petrol station mark indicates a road, to which a petrol station is adjacent. FL indicates a distance between guiding points.

If the information regarding the street Sn has not been stored, the rough route map display processing unit 33 displays information indicating "NO STREET COMPATIBEL TO DISPLAY CONDITION" (step ST14).

As apparent from the foregoing, according to the first embodiment, since display data is generated for a rough route map extracting only information satisfying a display condition when the display condition is set for the rough route map, the user can view desired information without performing any burdensome operations.

Second Embodiment

The first embodiment has been described by way of example of displaying the rough route map regarding the traffic jam and the road adjacent to the specified facility. However, the invention is not limited to such. For example, it is possible to display a rough route map regarding only a main road, a rough route map regarding only a road having a road number added thereto (e.g., national road), a rough route map regarding only a toll road, information regarding a roll road (e.g., toll road exit, interchange, branch road, or the like), a rough route map regarding only a left-turn road, or a rough route map regarding only a right-turn road.

Third Embodiment

The first embodiment has been described based on the case where "TRAFFIC JAM" and "ROAD ADJACENT TO PETROL STATION" are set as display conditions for the rough route map. However, setting of a logical product/logical sum of a plurality of display conditions may be accepted.

Thus, it is possible to finely set display conditions for the rough route map.

As apparent from the foregoing, the advantages of the invention can be summarized as follows. That is, when a display condition is set for a rough route map, display data is generated for the rough route map extracting only information satisfying the display condition. Thus, the user can view desired information without performing any burdensome operations.

When a display condition is set for displaying a rough route map regarding only a main road, display data is generated for the rough route map regarding only the main road. Thus, it is possible to easily obtain a general idea of a route.

When a display condition is set for displaying a rough route map regarding only a road having a road number attached thereto, display data is generated for the rough route map regarding only the road having the road number attached thereto. Thus, it is possible to easily identify a road of a traffic jam beforehand.

When a display condition is set for displaying a rough route map regarding only a toll road, display data is generated for the rough route map regarding only the toll road. Thus, it is possible to easily identify a toll road included in the route.

When a vehicle starts running on a toll road, display data is generated for displaying only information regarding the toll road. Thus, it is possible to obtain information useful for running on the toll road.

When a display condition is set for displaying a rough route map regarding only a left-turn road, display data is generated for the rough route map regarding only the left-turn road. Thus, it is possible to easily identify the point of turning left.

When a display condition is set for displaying a rough route map regarding only a right-turn road, display data is generated for the rough route map regarding only the right-turn road. Thus, it is possible to easily identify the point of turning right.

When a display condition is set for displaying a rough route map regarding only a road adjacent to a specified facility, display data is generated for the rough route map regarding only the road adjacent to the specified facility. Thus, the user can easily identify the location of a target facility on the route.

When a display condition is set for displaying a rough route map regarding only a traffic jam, display data is generated for the rough route map regarding only the traffic jam. Thus, it is possible to easily identify the place of a traffic jam on the route.

When a rough route map regarding a traffic jam is displayed in accordance with display data generated by the data generating means, the degree of congestion is displayed. Thus, it is possible to predict time required to reach a destination.

When a rough route map is displayed in accordance with display data generated by the data generating means, displaying is executed indicating that only a rough route map satisfying a display condition is being displayed at present. Thus, it is possible to recognize the on-going setting of a display condition.

When display data is generated for a rough route map satisfying a display condition, a distance between roads satisfying the display condition is calculated by considering the presence of a road having been omitted because of dissatisfaction of the display condition, and the data of the distance is included in the display data. Thus, it is possible to recognize a distance between the roads being displayed.

When a display condition is set for a rough route map, the setting of a logical product/logical sum of one or more display conditions is accepted. Thus, it is possible to finely set display conditions for the rough route map.

Display data is generated for a rough route map for displaying the names of respective roads in a route searched by the route searching means in a list form and, when a display condition is set, roads are extracted from the respective roads in the searched route according to the display condition, and display data is generated for a rough route map for displaying the names of the extracted roads in a list form. Thus, it is possible to easily recognize the road compatible to the display condition.

What is claimed is:

1. A navigation apparatus comprising:
   route searching means for searching a route from a present position to a destination;
   data generating means for generating display data of a rough route map which are information about characteristics of guiding points along the searched route based on the route searched by said route searching means; and
   displaying means for displaying the rough route map which is different from usual road map and is composed with the display data generated by said data generating means and route guiding map that only shows the searched route and its peripheral roads,
   wherein when a display condition is set for the rough route map, said data generating means makes the display data of the rough route map by extraction of only information satisfying the display condition.

2. A navigation apparatus according to claim 1, wherein when said display condition is set for displaying said rough route map regarding only a main road, said data generating means generates display data of the rough route map regarding only the main road.

3. A navigation apparatus according to claim 1, wherein when said display condition is set for displaying said rough route map regarding only a road having a road number added thereto, said data generating means generates display data of the rough route map regarding only the road having the road number added thereto.

4. A navigation apparatus according to claim 1, wherein when said display condition is set for displaying said rough route map regarding only a toll road, said data generating means generates display data of the rough route map regarding only the toll road.

5. A navigation apparatus according to claim 1, wherein when a vehicle starts running on a toll road, said data generating means generates display data for displaying only information regarding the toll road.

6. A navigation apparatus according to claim 1, wherein when said display condition is set for displaying said rough route map regarding only a left-turn road, said data generating means generates display data of the rough route map regarding only the left-turn road.

7. A navigation apparatus according to claim 1, wherein when said condition is set for displaying said rough route map regarding only a right-turn road, said data generating means generates display data of the rough route map regarding only the right-turn road.

8. A navigation apparatus according to claim 1, wherein when said display road condition is set for displaying said rough route map regarding only a road adjacent to a specified facility, said data generating means generates display data of the rough route map regarding only the road adjacent to the specified facility.

9. A navigation apparatus according to claim 1, wherein when said condition is set for displaying said rough route map regarding only a traffic jam, said data generating means generates display data of the rough route map regarding only the traffic jam.

10. A navigation apparatus according to claim 9, wherein when the rough route map regarding the traffic jam is displayed in accordance with the display data generated by said data generating means, said displaying means displays a degree of congestion.

11. A navigation apparatus according to claim 1, wherein when the rough route map is displayed in accordance with the display data generated by said data generating means, said displaying means executes displaying, indicating that only said rough route map satisfying the display road condition is being displayed at present.

12. A navigation apparatus according to claim 1, wherein when display data is generated for the rough route map satisfying the display condition, said data generating means calculates a distance between roads satisfying the display condition by considering presence of a road having been omitted because of dissatisfaction of the display condition, and includes data of the distance in the display data.

13. A navigation apparatus according to claim 1, wherein when setting of the display data for the rough route map is accepted, setting of a logical product/logical sum of two or more display conditions is accepted.

14. A navigation apparatus, comprising:
    route searching means for searching a route from a present position to a destination;
    data generating means for generating display data of a rough route map which are names of respective roads in a list form in the searched route based on the route searched by said route searching means; and
    displaying means for displaying the rough route map which is different from usual road map and is composed with the display data generated by said data generating means and route guiding map that only shows the searched route and its peripheral roads,
    wherein when a display condition is set for the rough route map, said data generating means makes the display data of the rough route map by extraction of only roads in accordance with the display condition from said display data.

* * * * *